June 9, 1925.  F. J. SCHUMAN  1,541,530

WHEEL PULLER

Filed Jan. 9, 1923

INVENTOR.
Frank J. Schuman
BY
Fay, Oberlin & Fay
ATTORNEYS

Patented June 9, 1925.

1,541,530

UNITED STATES PATENT OFFICE.

FRANK J. SCHUMAN, OF CLEVELAND HEIGHTS, OHIO.

WHEEL PULLER.

Application filed January 9, 1923. Serial No. 611,562.

*To all whom it may concern:*

Be it known that I, FRANK J. SCHUMAN, a citizen of the United States, and a resident of Cleveland Heights, county of Cuyahoga, and State of Ohio, have invented a new and useful Improvement in Wheel Pullers, of which the following is a specification, the principle of the invention being herein explained and the best mode in which I have contemplated applying that principle so as to distinguish it from other inventions.

The present invention, relating, as indicated to wheel-pullers, is more particularly directed to the provision of an improved and simplified type of wheel-puller which shall have a very much longer life than those now in common use, and which shall be less expensive to manufacture. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1:
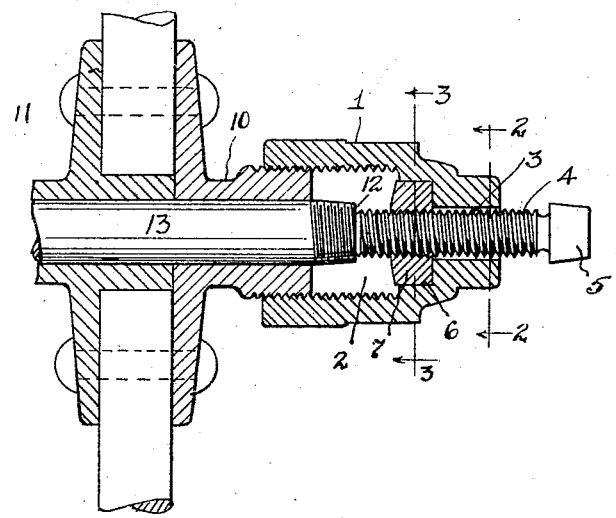
Figure 3:
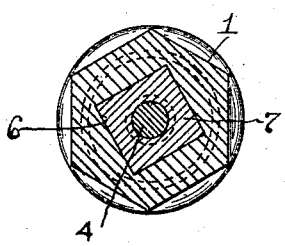
Figure 2:
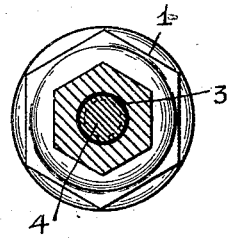

Fig. 1 is a longitudinal central view of my improved wheel-puller mounted on a wheel ready for operation; Fig. 2 is a section on the line 2—2, Fig. 1; and Fig. 3 is a section on the line 3—3 in Fig. 1.

A wheel-puller consists of a hollow cup or member which is internally threaded to adapt it to engage the threaded flange on the wheel of a motor vehicle. This cup is usually provided with threading, into which is inserted a screw which may be turned down to engage against the axle on which the wheel is carried. Turning down the screw pulls the wheel from off the axle by reason of the relative movement between the screw and the cup, the cup being attached to the flange of the wheel and the screw abutting against the end of the axle. It is usually necessary, however, to strike the end of the screw to loosen the engagement between the axle and the wheel, and sometimes a number of blows are necessary before the engagement is loosened sufficiently for the wheel to be pulled off by the further turning down of the screw. The cause of the short life of the wheel-pullers now in common use is that each time a blow is struck on the end of the screw much of the force of this blow is received and taken up by the interengaging threads on the cap and on the screw, and in a short time these threads are so mutilated and worn that they no longer operate effectively.

My improved wheel-puller consists of a cap or tubular member 1 provided with a hollow center 2 and an opening 3 through its outer end. Through this opening 3 there extends a screw 4 having a square head 5, and this screw is loose in the opening 3 and does not contact with the walls thereof. In the inner hollow portion 2 of the cap there is a square recess 6, in which is loosely mounted a nut 7 of the same shape as the recess, so that while the nut may move axially of the cup in this recess it cannot turn. The screw 4 is engaged with the threading in the nut 7.

In operation the cup 1 is first engaged with the flange 10 on the wheel 11, and the screw 4 is then turned down until it engages against the end 12 of the axle shaft 13. A few blows are then struck against the end 5 of the screw to loosen the engagement between the wheel and the axle, and after each blow the screw is turned down again as far as it will go. This action loosens the engagement between the wheel and axle and draws the wheel away from the axle until it slips freely off the end. The particular advantage of the present construction is that the nut 7 may move with the screw 4 when the latter is struck, and no portion of the force of the blows on the screw is taken up between the threads on the screw and the nut. A further advantage is there is only one threading operation to be performed on the cap, instead of two, as in the ordinary wheel-pullers, the other threads in which the screw operates being provided by the nut 7, which is of course an extremely inexpensive article.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a wheel puller, the combination of a circumferentially continuous tubular member provided with areas of polygonal shape adjacent its exterior central and outer portions for engagement by a wrench, and having a restricted axial opening adjacent one end, and a countersunk polygonal recess about the inner end of said restricted opening, an enlarged screw-threaded bore extending from the inner edge of said recess to the opposite end of said tubular member, said screw threads being adapted to engage the external threads of the hub of an automobile wheel, a screw having a polygonal head and adapted to have its lower end passed freely through the restricted opening in said tubular member and bear against the end of the wheel axle, and a nut engaged upon said screw and adapted to seat within said polygonal recess to supply a bearing for said screw when it is rotated to force its lower end against said axle.

Signed by me this 28th day of December, 1922.

FRANK J. SCHUMAN.